United States Patent
Tang

(10) Patent No.: US 11,184,891 B2
(45) Date of Patent: Nov. 23, 2021

(54) TIME-DOMAIN RESOURCE INFORMATION INDICATION METHOD AND APPARATUS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 63 days.

(21) Appl. No.: 16/617,481

(22) PCT Filed: Jun. 14, 2017

(86) PCT No.: PCT/CN2017/088244
§ 371 (c)(1),
(2) Date: Nov. 26, 2019

(87) PCT Pub. No.: WO2018/227428
PCT Pub. Date: Dec. 20, 2018

(65) Prior Publication Data
US 2020/0163084 A1 May 21, 2020

(51) Int. Cl.
*H04W 72/04* (2009.01)
*H04L 5/00* (2006.01)
*H04L 1/16* (2006.01)

(52) U.S. Cl.
CPC ....... *H04W 72/0446* (2013.01); *H04L 1/1614* (2013.01); *H04L 5/0094* (2013.01)

(58) Field of Classification Search
CPC . H04W 72/0446; H04L 1/1614; H04L 5/0094
See application file for complete search history.

(56) References Cited

U.S. PATENT DOCUMENTS 8,976,694 B2   3/2015   Feuersanger et al.
9,252,937 B2   2/2016   Jin et al.
(Continued)

FOREIGN PATENT DOCUMENTS

CN   104010375 A   8/2014
CN   106162906 A   11/2016
(Continued)

OTHER PUBLICATIONS

R1-1707403, 'Timing relationships for DL scheduling', Intel Corporation, 3GPP TSG RAN WG1 #89, May 15-19, 2017, pp. 1-5 (highlights by Examiner). (Year: 2017).*
(Continued)

*Primary Examiner* — Melvin C Marcelo
(74) *Attorney, Agent, or Firm* — Young Basile Hanlon & MacFarlane, P.C.

(57) ABSTRACT

A method and an apparatus for indicating time domain resource information are provided, wherein the method includes the following acts: conveying, based on preset subcarrier spacing information, time domain resource indication information of a data channel in a mobile communication system adopting multiple subcarrier spacings. The preset subcarrier spacing information may include one of the multiple subcarrier spacings, or may be based on a rule of the multiple subcarrier spacings. In the present disclosure, a mechanism for indicating time domain resource information of a data channel based on preset subcarrier spacing information is provided for systems adopting multiple subcarrier spacings, such as 5G NR.

14 Claims, 8 Drawing Sheets

(56) References Cited

U.S. PATENT DOCUMENTS

| | | | |
|---|---|---|---|
| 9,549,382 | B2 | 1/2017 | Dinan |
| 2013/0230015 | A1 | 9/2013 | Hoymann et al. |
| 2016/0352551 | A1* | 12/2016 | Zhang ............... H04L 27/26025 |
| 2017/0332378 | A1* | 11/2017 | Werner ............. H04W 72/0453 |
| 2018/0124804 | A1 | 5/2018 | Yao et al. |

FOREIGN PATENT DOCUMENTS

| | | | |
|---|---|---|---|
| CN | 106376050 | A | 2/2017 |
| CN | 106576023 | A | 4/2017 |
| CN | 106817722 | A | 6/2017 |
| CN | 108029096 | A | 5/2018 |
| JP | 2020504979 | A | 2/2020 |
| RU | 2425459 | C2 | 7/2011 |
| WO | 2014048076 | A1 | 4/2014 |
| WO | 2016004634 | A1 | 1/2016 |
| WO | 2016045094 | A1 | 3/2016 |
| WO | 2016166937 | A1 | 10/2016 |
| WO | 2016192644 | A1 | 12/2016 |
| WO | 2018126382 | A1 | 7/2018 |

OTHER PUBLICATIONS

Communication pursuant to Article 94(3) EPC Examination for EP Application 17913853.2 dated Nov. 30, 2020.
3GPP TSG RAN WG1 #89; Hangzhou, P.R. China, May 15-19, 2017; R1-1707403.
Russia for RU Application 2019140360/07(079090) dated Sep. 8, 2020.
European search report issued in corresponding European application No. 17913853.2 dated Mar. 30, 2020.
English Translation of Russian Office Action dated Jun. 10, 2020 from Application No. 2019140360.
XP51159900A; 3GPP TSG-RAN WG1 #86bis; Lisbon, Portugal, Oct. 10-14, 2016; RI-1610089.
XP51274252A; 3GPP TSG-RAN WG1 #89; Hangzhou, China, May 15-19, 2017; R1-1709094.
XP51277462A; 3GPP TSG-RAN WG4 Meeting #83; Hangzhou, China, May 15-19, 2017; R4-1705343.
Canada First Office Action for CA Application 3,064,819 dated Jan. 20, 2021. (4 pages).
Chile First Office Action with English translation for CL Application 201903609 dated Feb. 18, 2021. (36 pages).
India First Examination Report for IN Application 201917051493 dated Mar. 22, 2021. (5 pages).
Singapore First Office Action for SG Application 11201911019X dated Apr. 2, 2021. (7 pages).
Taiwan Office Action with English Tranlation for TW Application 11020486970 dated May 25, 2021. (13 pages).
Chinese First Office Action with English Translation for CN Application 202010081171.7 dated Apr. 19, 2021. (23 pages).
3GPP TSG RAN WG1 Meeting #89 Hangzhou, P.R. China, Multiplexing between PDCCH and PDSCH for various data durations, R1-1707729, May 15-19, 2017.
3GPP TSG RAN WG1 Meeting #89 Hangzhou, China, Discussion on data transmission duration, RI-1708123, May 15-19, 2017.
Chinese Second Office Action with English Translation for CN Application 202010081171.7 dated Jul. 26, 2021. (19 pages).
Japanese Office Action with English Translation for JP Application 2019568254 dated Aug. 6, 2021. (12 pages).
Korean Office Action with English Translation for KR Application 1020197036625 dated Aug. 20, 2021. (10 pages).

* cited by examiner

TIME-DOMAIN RESOURCE INFORMATION INDICATION METHOD AND APPARATUS

CROSS-REFERENCE TO RELATED APPLICATION(S)

This application is a 371 application of International Application No. PCT/CN2017/088244, filed on Jun. 14, 2017, the entire disclosure of which is hereby incorporated by reference.

TECHNICAL FIELD

The present disclosure relates to a field of wireless communication technology, in particular to a method and an apparatus for indicating time domain resource information.

BACKGROUND

In an LTE (Long Term Evolution) system, only one subcarrier spacing, i.e., 15 kHz, is used, and both control channel and data channel use a numerology based on the subcarrier spacing. However, with continuous development of communication technology, in order to realize larger bandwidths, shorter delays and wider service requirements in a 5G NR (New Radio) system, multiple subcarrier spacings, such as 3.75 kHz, 30 kHz, 60 kHz and 120 kHz, will be introduced. Since the control channel and the data channel have different characteristics, it is allowed to use different subcarrier spacings for the control channel and the data channel so as to maintain flexibility in resource allocation.

In the existing LTE system, information of time domain resources occupied by the data channel is indicated based on a single subcarrier spacing by default, and the starting point and transmission length of the data channel included in the indication information only need to include the number of time units such as symbols/time slots. If this indication manner is used in a 5G NR system, since a terminal device is unaware of which subcarrier spacing the indication information is based on, it needs to try decoding based on multiple subcarrier spacings respectively, which greatly increases terminal complexity and resource consumption (e.g. power consumption).

SUMMARY

In view of this, the present disclosure provides a method and a device for indicating time domain resource information, so as to be suitable for systems, such as 5G NR, adopting multiple subcarrier spacings.

The present disclosure provides a method for indicating time domain resource information, including: conveying, based on preset subcarrier spacing information, the time domain resource indication information of a data channel in a mobile communication system adopting multiple subcarrier spacings.

According to a specific implementation of the present disclosure, the preset subcarrier spacing information includes one of the multiple subcarrier spacings, or a rule based on the multiple subcarrier spacings.

According to a specific implementation of the present disclosure, conveying, based on the preset subcarrier spacing information, the time domain resource indication information of the data channel, includes: transmitting, by a first device, the time domain resource indication information of the data channel to a second device based on the preset subcarrier spacing information; or, receiving, by the second device, the time domain resource indication information of the data channel transmitted by the first device based on the preset subcarrier spacing information.

According to a specific implementation of the present disclosure, the time domain resource indication information of the data channel includes: one or any combination of a time domain starting point, a time domain ending point and a time domain length of the data channel; or, a symbol or time slot occupied by the data channel.

According to a specific implementation of the present disclosure, the time domain resource indication information of the data channel further includes at least one of the following: indication information of a subcarrier spacing on which the time domain resource indication information is based; a value of the subcarrier spacing on which the time domain resource indication information is based; indication information of a rule on which the time domain resource indication information is based, wherein the rule is based on the multiple subcarrier spacings.

According to a specific implementation of the present disclosure, the time domain length of the data channel is indicated based on the subcarrier spacing adopted by the data channel.

According to a specific implementation of the present disclosure, the time domain length of the data channel is indicated based on the subcarrier spacing adopted by the data channel, including: the time domain length of the data channel is indicated in units of a first symbol length or a first slot length, wherein the first symbol length is a symbol length based on the subcarrier spacing adopted by the data channel, and the first slot length is a slot length based on the subcarrier spacing adopted by the data channel.

According to a specific implementation of the present disclosure, the time domain starting point and/or the time domain ending point of the data channel is indicated based on the subcarrier spacing adopted by the data channel; or, the time domain starting point and/or the time domain ending point of the data channel is indicated based on a rule, wherein the rule is based on the multiple subcarrier spacings.

According to a specific implementation of the present disclosure, the time domain starting point and/or the time domain ending point of the data channel is indicated based on the subcarrier spacing adopted by the data channel, including: the time domain starting point and/or the time domain ending point of the data channel is indicated in units of a first symbol length and/or a first slot length, wherein the first symbol length is a symbol length based on the subcarrier spacing adopted by the data channel, and the first slot length is a slot length based on the subcarrier spacing adopted by the data channel.

According to a specific implementation of the present disclosure, the time domain starting point and/or the time domain ending point of the data channel is indicated in units of the first symbol length and/or the first slot length, including: the time domain starting point and/or time domain ending point of the data channel is indicated by a number of the first symbol lengths and/or the first slot lengths contained in an offset of a time domain position of the data channel relative to that of the control channel; or, the time domain starting point and/or the time domain ending point of the data channel is indicated by a number of the first symbol lengths and/or the first slot lengths contained in an offset of a time domain position of the data channel relative to that of a time domain region containing the control channel.

According to a specific implementation of the present disclosure, the time domain location of the control channel includes: the symbol or time slot based on the subcarrier spacing of the data channel where the time domain starting point or time domain ending point of the control channel is located.

According to a specific implementation of the present disclosure, the rule includes: a maximum subcarrier spacing among the multiple subcarrier spacings adopted by the mobile communication system.

According to a specific implementation of the present disclosure, the time domain starting point and/or the time domain ending point of the data channel is indicated based on a rule, including: the time domain starting point and/or the time domain ending point of the data channel is indicated in units of a second symbol length and/or a second slot length, wherein the second symbol length is a symbol length based on the maximum subcarrier spacing and the second slot length is a slot length based on the maximum subcarrier spacing.

According to a specific implementation of the present disclosure, indicating, the time domain starting point and/or the time domain ending point of the data channel is indicated in units of the second symbol length and/or the second slot length, including: the time domain starting point and/or time domain ending point of the data channel is indicated by a number of the second symbol lengths and/or the second slot lengths contained in an offset of a time domain position of the data channel relative to that of the control channel; or, the time domain starting point and/or the time domain ending point of the data channel is indicated by a number of the second symbol lengths and/or the second slot lengths contained in an offset of a time domain position of the data channel relative to that of a the time domain region containing the control channel.

According to a specific implementation of the present disclosure, the time domain location of the control channel includes: the symbol or time slot based on the maximum subcarrier spacing where the time domain start point or time domain end point of the control channel is located.

According to a specific implementation of the present disclosure, the time domain region containing the control channel includes: a control resource set or search space containing the control channel.

According to a specific implementation of the present disclosure, the symbol occupied by the data channel is indicated by a bitmap based on the first symbol length; the time slot occupied by the data channel is indicated by a bitmap based on the first slot length; wherein, the first symbol length is a symbol length based on the subcarrier spacing adopted by the data channel, and the first slot length is a slot length based on the subcarrier spacing adopted by the data channel.

According to a specific implementation of the present disclosure, the control channel and the data channel adopt different bandwidth parts in the mobile communication system.

According to a specific implementation of the present disclosure, the first device is a network side device and the second device is a terminal device; or, the first device is a first terminal device and the second device is a second terminal device.

According to a specific implementation of the present disclosure, the mobile communication system adopting multiple subcarrier spacings includes a 5G NR system.

The present disclosure also provides an apparatus for indicating time domain resource information, including: an indication transmission unit, used for conveying, based on preset subcarrier spacing information, time domain resource indication information of a data channel in a mobile communication system adopting multiple subcarrier spacings.

According to a specific implementation of the present disclosure, the apparatus is arranged in the first device, the apparatus further includes: an indication determination unit, used for, based on the preset subcarrier spacing information, determining to transmit the time domain resource indication information of the data channel, and provide the time domain resource indication information to the indication transmission unit; the indication transmission unit is used for transmitting the time domain resource indication information of the data channel to a second device.

According to a specific implementation of the present disclosure, the apparatus is arranged in the second device, the apparatus further includes an indication parsing unit; the indication transmission unit is used for receiving the time domain resource indication information of the data channel transmitted by the first device; the indication parsing unit is used for parsing, based on the preset subcarrier spacing information, the time domain resource indication information of the data channel received by the indication determination unit, to determine a time domain resource occupied by the data channel.

According to a specific implementation of the present disclosure, the preset subcarrier spacing information includes one of the multiple subcarrier spacings, or a rule based on the multiple subcarrier spacings.

According to a specific implementation of the present disclosure, the time domain resource indication information of the data channel includes: one or any combination of a time domain starting point, a time domain ending point and a time domain length of the data channel; or, a symbol or time slot occupied by the data channel.

According to a specific implementation of the present disclosure, the time domain resource indication information of the data channel further includes at least one of the following: indication information of a subcarrier spacing on which the time domain resource indication information is based; a value of the subcarrier spacing on which the time domain resource indication information is based; indication information of a rule on which the time domain resource indication information is based, wherein the rule is based on the multiple subcarrier spacings.

According to a specific implementation of the present disclosure, the time domain length of the data channel is indicated based on the subcarrier spacing adopted by the data channel.

According to a specific implementation of the present disclosure, a time domain starting point and/or a time domain ending point of the data channel is indicated based on the subcarrier spacing adopted by the data channel; or, the time domain starting point and/or the time domain ending point of the data channel is indicated based on the rule, and the rule is based on the multiple subcarrier spacings.

According to a specific implementation of the present disclosure, the rule includes a maximum subcarrier spacing among the multiple subcarrier spacings adopted by the mobile communication system.

According to a specific implementation of the present disclosure, the symbol occupied by the data channel is indicated by a bitmap based on a first symbol length; the time slot occupied by the data channel is indicated by bitmap based on the first slot length; the first symbol length is a symbol length based on the subcarrier spacing adopted by the data channel, and the first slot length is a slot length based on the subcarrier spacing adopted by the data channel.

According to a specific implementation of the present disclosure, in the mobile communication system, the control channel and the data channel adopt different bandwidth parts.

The present disclosure also provides a device, including one or more processors; a memory; one or more programs stored in the memory and executed by the one or more processors to implement operations of the above method.

The present disclosure also provides a storage medium containing computer-executable instructions which, when executed by a computer processor, implement operations of the aforementioned method.

DETAILED DESCRIPTION

Figure 1:
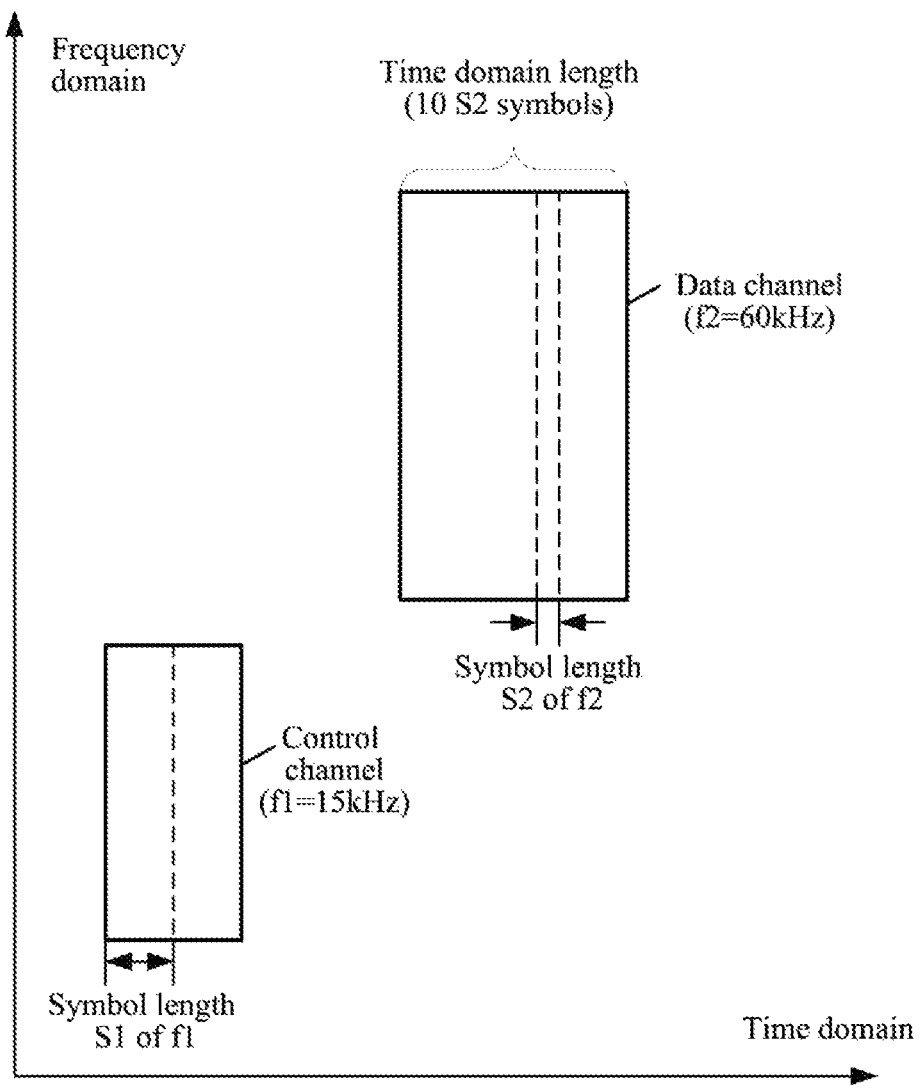
FIG. 1 is a schematic diagram of an indication of a time domain length of a data channel provided by implementation 1 of the present disclosure.

In order to make the object, solution and advantage of the present disclosure clearer, the present disclosure will be described in details below with reference to the drawings and specific implementations.

The main idea of the present disclosure is that, in a 5G NR system, since multiple subcarrier spacings are adopted, a first device may transmit the time domain resource indication information of a data channel to a second device based on preset subcarrier spacing information. The preset subcarrier spacing information may include, but is not limited to, one of multiple subcarrier spacings adopted by the system, a rule based on multiple subcarrier spacings, and the like.

In addition, the first device may be a network side device and the second device may be a terminal device, that is, the network side device indicates the time domain resource information of the data channel to the terminal device based on the preset subcarrier spacing information. However, the present disclosure is also applicable to communication between terminal devices, that is, the first terminal device indicates the time domain resource information of the data channel to the second terminal device so that transmission and reception of the data channel may be performed according to the indication between the first terminal device and the second terminal device. In following implementations, description will be made by taking the network side device indicating to the terminal device as an example.

The terminal device involved in an implementation of the present disclosure may include, but is not limited to, a mobile phone, a tablet computer, a notebook computer, a PDA, a multimedia device, even an Internet car, an intelligent wearable device, etc., with wireless communication function. The network side device involved in an implementation of the present disclosure may include, but is not limited to, a base station device, such as BST, NodeB, eNodeB. The method provided by the present disclosure will be described in details below with reference to implementations.

The time domain resource indication information of the data channel may include one or any combination of a time domain starting point, a time domain ending point and a time domain length of the data channel; or, a symbol or time slot occupied by the data channel. For example, a manner of indicating "a starting point+a time domain length" of the data channel may be adopted. For another example, a manner of indicating "a starting point+an ending point" of the data channel may be adopted. For another example, a manner of indicating which symbol or time slot is occupied by the data channel may be adopted, etc.

As an implementation, the indication information transmitted by the network side device to the terminal device only contains one or any combination of the above-mentioned time domain starting point, time domain ending point and time domain length of the data channel; or, the symbol or time slot occupied by the data channel. However, the preset subcarrier information on which the indication information is based may adopt a manner agreed in advance by the network side device and the terminal device.

As yet another implementation, the indication information transmitted by the network side device to the terminal device may further include, in addition to one or any combination of the above-mentioned time domain starting point, time domain ending point and time domain length of the data channel, or, in addition to the symbol or time slot occupied by the data channel, the preset subcarrier information on which the indication information is based. For example, 3 bits may be used to indicate the preset subcarrier information on which the indication information is based.

Several examples are given in the following.

Example 1

The indication information includes indication information of a subcarrier spacing on which the time domain resource information is based. Since multiple subcarrier spacings may be adopted in a 5G NR system, for example, the control channel adopts a subcarrier spacing f1 and the data channel adopts a subcarrier spacing f2, if the time domain resources of data channels are indicated based on f2, the indication information of f2 adopted may be further indicated in the above indication information.

Example 2

The indication information includes a value of the subcarrier spacing on which the time domain resource information is based. Different from Example 1 in which the indication information includes indication information of the subcarrier spacing, the specific value of the subcarrier spacing is directly given in Example 2.

Example 3

The indication information includes indication information of a rule on which the time domain resource indication information is based, and the rule is based on multiple subcarrier spacings. For example, in a 5G NR system, if a control channel adopts a subcarrier spacing f1 and a data channel adopts a subcarrier spacing f2, the time domain resources of the data channel may be indicated based on a rule f(f1,f2). For example, f(f1,f2) may be max(f1,f2), i.e. the maximum subcarrier spacing among the multiple subcarrier spacings is used. Of course, other rules may be adopted and will not be enumerated here.

Implementation One

A time domain length of a data channel is indicated based on a subcarrier spacing adopted by the data channel. That is, a network side device indicates a time domain length of the data channel based on the subcarrier spacing adopted by the data channel. For example, assuming that a subcarrier spacing of a control channel is f1, a subcarrier spacing of a data channel is f2, a symbol length based on f2 is S2, and a slot length based on f2 is D2, then the time domain length of the data channel is indicated in units of S2 or D2, which may be embodied as the number of S2s or D2s included.

As shown in FIG. 1, assuming f1 is 15 kHz and f2 is 60 kHz, the symbol length S1 of the control channel is 4 times the symbol length S2 of the data channel, when indicating the time domain length of the data channel, S2 is used as a unit for indication, for example, 10 symbols, each of which the length is S2.

Figure 2:
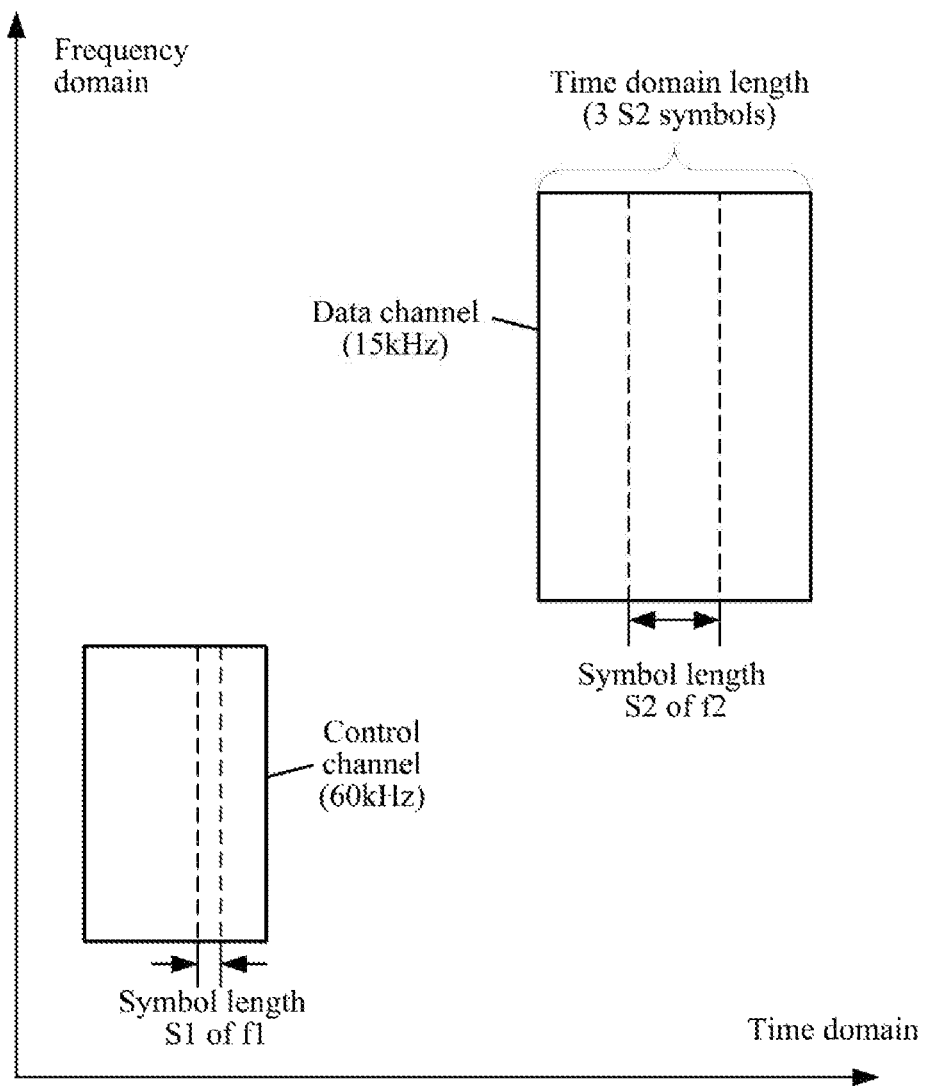
FIG. 2 is a schematic diagram of an indication of another time domain length of a data channel provided by implementation 1 of the present disclosure.

As shown in FIG. 2, assuming f1 is 60 kHz and f2 is 15 kHz, the symbol length S2 of the data channel is 4 times the symbol length S1 of the control channel, when indicating the time domain length of the data channel, S2 is used as a unit for indication, for example, 3 symbols, each of which the length is S2.

This manner does not need to directly indicate a subcarrier spacing for measuring the length of the data channel, and both ends are directly based on the numerology of the subcarrier spacing adopted by the data channel, thus saving the overhead of control signaling.

Implementation Two

A time domain starting point and/or a time domain ending point of a data channel is indicated based on a subcarrier spacing adopted by the data channel. That is, the network side device indicates the time domain starting point and/or the time domain ending point of the data channel based on the subcarrier spacing adopted by the data channel. For example, assuming that the subcarrier spacing of the control channel is f1, the subcarrier spacing of the data channel is f2, a symbol length based on f2 is S2, and a slot length based on f2 is D2, then the time domain starting point or time domain ending point of the data channel is indicated in units of S2 and/or D2.

Specifically, the time domain starting point or time domain ending point of the data channel may be embodied as the number of S2s and/or D2s contained in the offset of the time domain position of the data channel relative to that of the control channel. Herein, the time domain position of the control channel may include a symbol or time slot based on f2 where the time domain starting point or time domain ending point of the control channel is located. In addition, it should be noted that in addition to the manner of reflecting the time domain starting point or the time domain ending point relative to the time domain position of the control channel, other manners such as the time domain position relative to the synchronization channel and may also be adopted.

Figure 3:
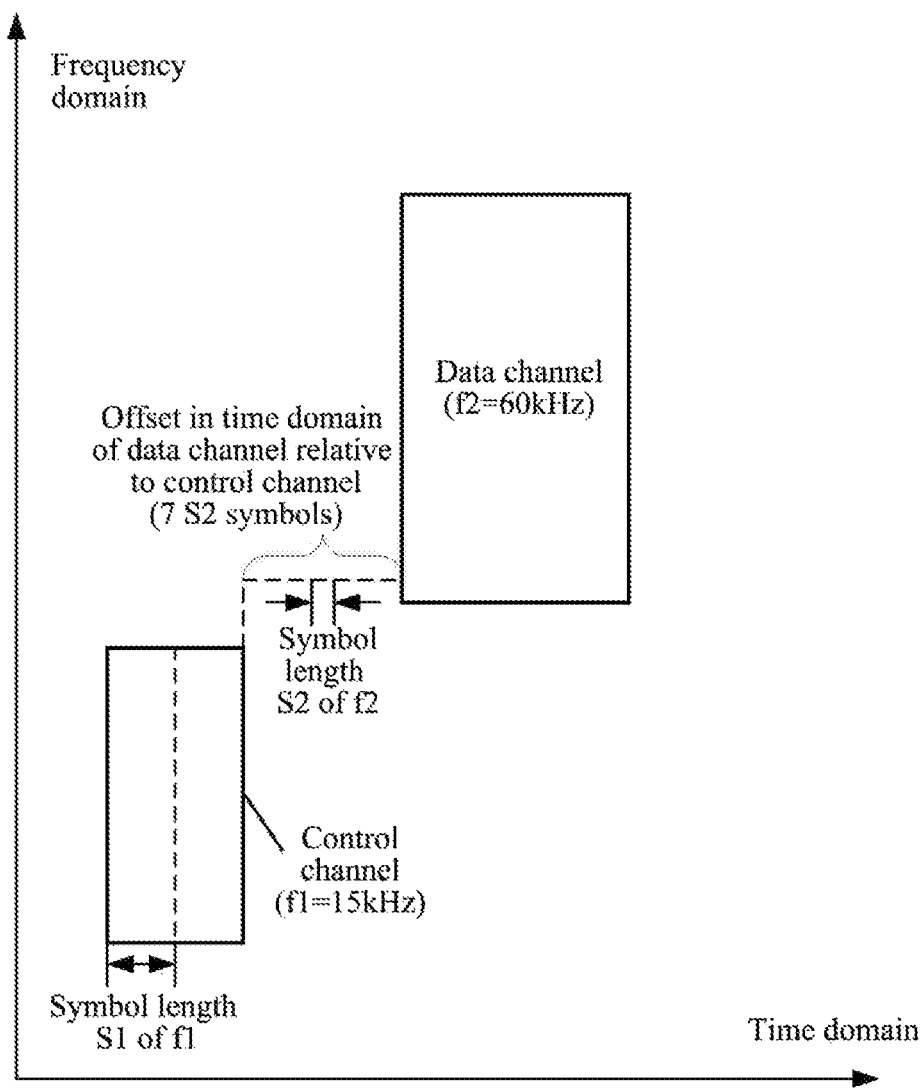
FIG. 3 is a schematic diagram of an indication of a time domain starting point of a data channel provided by implementation 2 of the present disclosure.

As shown in FIG. 3, assuming f1 is 15 kHz and f2 is 60 kHz, the symbol length S1 of the control channel is 4 times the symbol length S2 of the data channel, when indicating the time domain starting point of the data channel, S2 is used as a unit for indication, for example, the offset from the symbol based on f2 where the control channel end point is located to the time domain starting point of the data channel is 7 symbols, each of which the length is S2.

Figure 4:
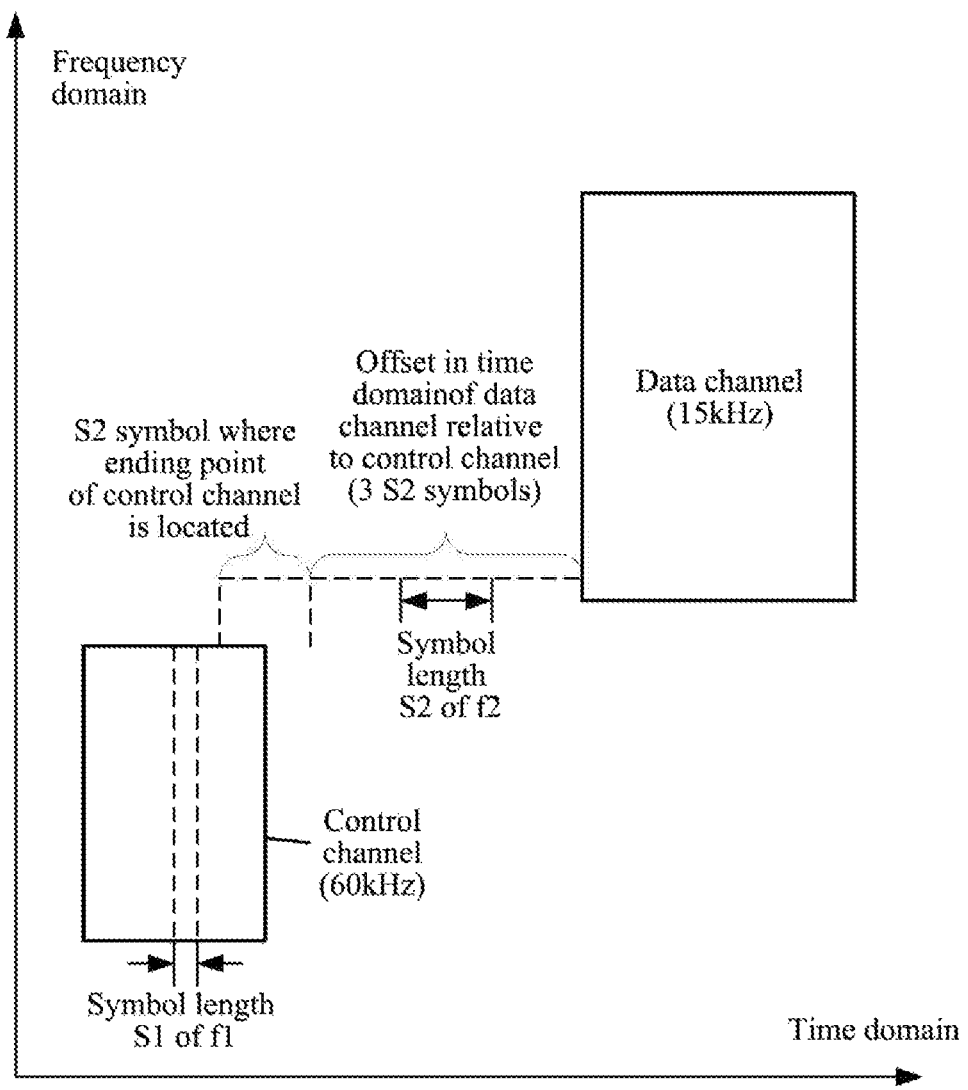
FIG. 4 is a schematic diagram of an indication of another time domain starting point of a data channel provided by implementation 2 of the present disclosure.

As shown in FIG. 4, assuming that f1 is 60 kHz and f2 is 15 kHz, the symbol length S2 of the data channel is 4 times the symbol length S1 of the control channel, and S2 is used as a unit when indicating the time domain starting point of the data channel. Firstly, a symbol with a length of S2 where the time domain ending point of the control channel is located is determined, and then the offset from the time domain starting point of the data channel to the symbol is indicated, for example, 3 symbols, each of which the length is S2.

Alternatively, the time domain starting point or time domain ending point of the data channel may be embodied as the number of S2s and/or D2s contained in the offset of the time domain position of the data channel relative to the time domain position of the time domain region containing the control channel. The time domain region containing the control channel may be a Control Resource Set or a Search Space containing the control channel.

The control resource set is a time-frequency resource range which may be occupied by the control channel. A transmitter transmits the control channel on a time-frequency resource in the control resource set, and a receiver receives the control channel on a time-frequency resource in the control resource set.

The search space is a time domain range in which the receiver retrieves the control channel. At a moment, the receiver does not need to search the control channel in the entire control resource set, but may search, according to some limitations, only in a smaller range, which is the search space. The time-frequency resources occupied by the search space are part of the control resource set.

Figure 5:
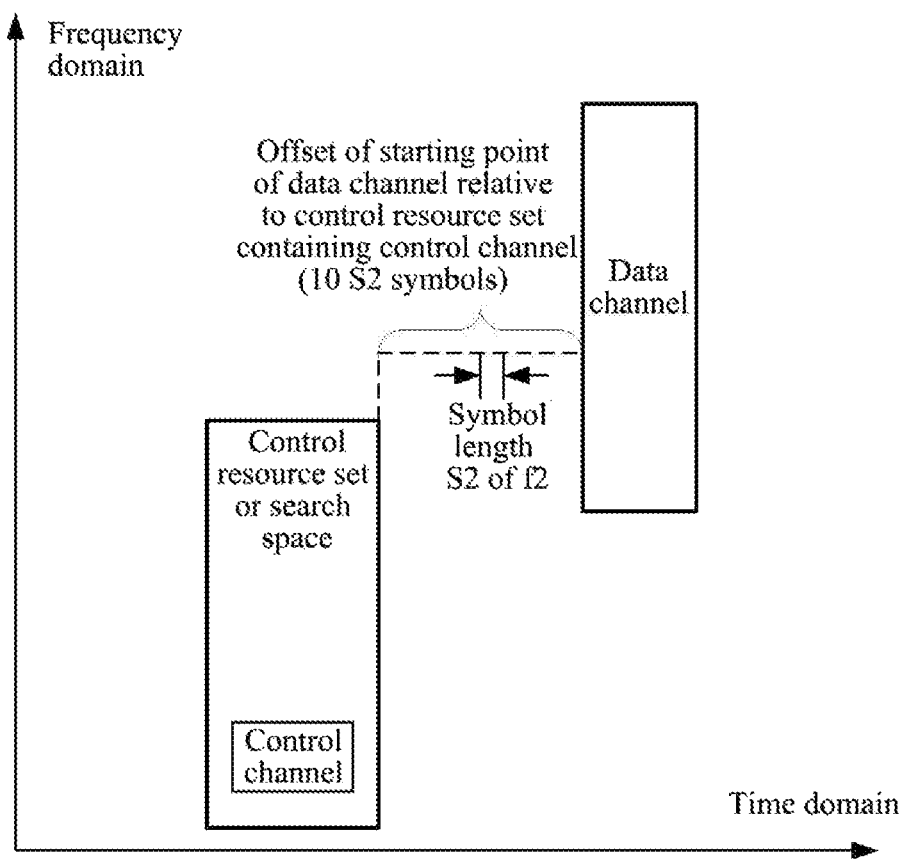
FIG. 5 is a schematic diagram of an indication of another time domain starting point of a data channel provided by implementation 2 of the present disclosure.

As shown in FIG. 5, assuming f1 is 15 kHz and f2 is 60 kHz, the symbol length S1 of the control channel is 4 times the symbol length S2 of the data channel, when indicating the time domain starting point of the data channel, S2 is used as a unit to indicate, for example, the offset from the control resource set containing the control channel to the time domain starting point of the data channel is 10 symbols, each of which the length is S2.

This manner does not need to directly indicate a subcarrier spacing for measuring the time domain starting point or ending point of the data channel, and both ends are directly based on the numerology of the subcarrier spacing adopted by the data channel, thus saving the overhead of control signaling.

Implementation 3

A time domain starting point and/or a time domain ending point of a data channel is indicated based on a rule, the rule is based on multiple subcarrier spacings. For example, the rule may be taking the maximum subcarrier spacing among various subcarrier spacings in a 5G NR system. That is, the network side device indicates the time domain starting point and/or a time domain ending point of the data channel based on the maximum subcarrier spacing. For example, assuming that the subcarrier spacing of the control channel is f1, the subcarrier spacing of the data channel is f2, the symbol length based on max(f1,f2) is S, and the slot length based on max(f1,f2) is D, then the time domain starting point or time domain ending point of the data channel is indicated in units of S and/or D.

Similarly to Implementation 2, the time domain starting point or time domain ending point of the data channel may be embodied as the number of Ss and/or Ds contained in the offset of the time domain position of the data channel relative to that of the control channel. The time domain position of the control channel may include a max(f1,f2)-based symbol or time slot where the time domain starting point or time domain ending point of the control channel is located.

Alternatively, the time domain starting point or the time domain ending point of the data channel may be embodied as the number of Ss and/or Ds contained in the offset of the time domain position of the data channel relative to the time domain region containing the control channel. The time domain region containing the control channel may be a Control Resource Set or a Search Space containing the control channel.

Figure 6:
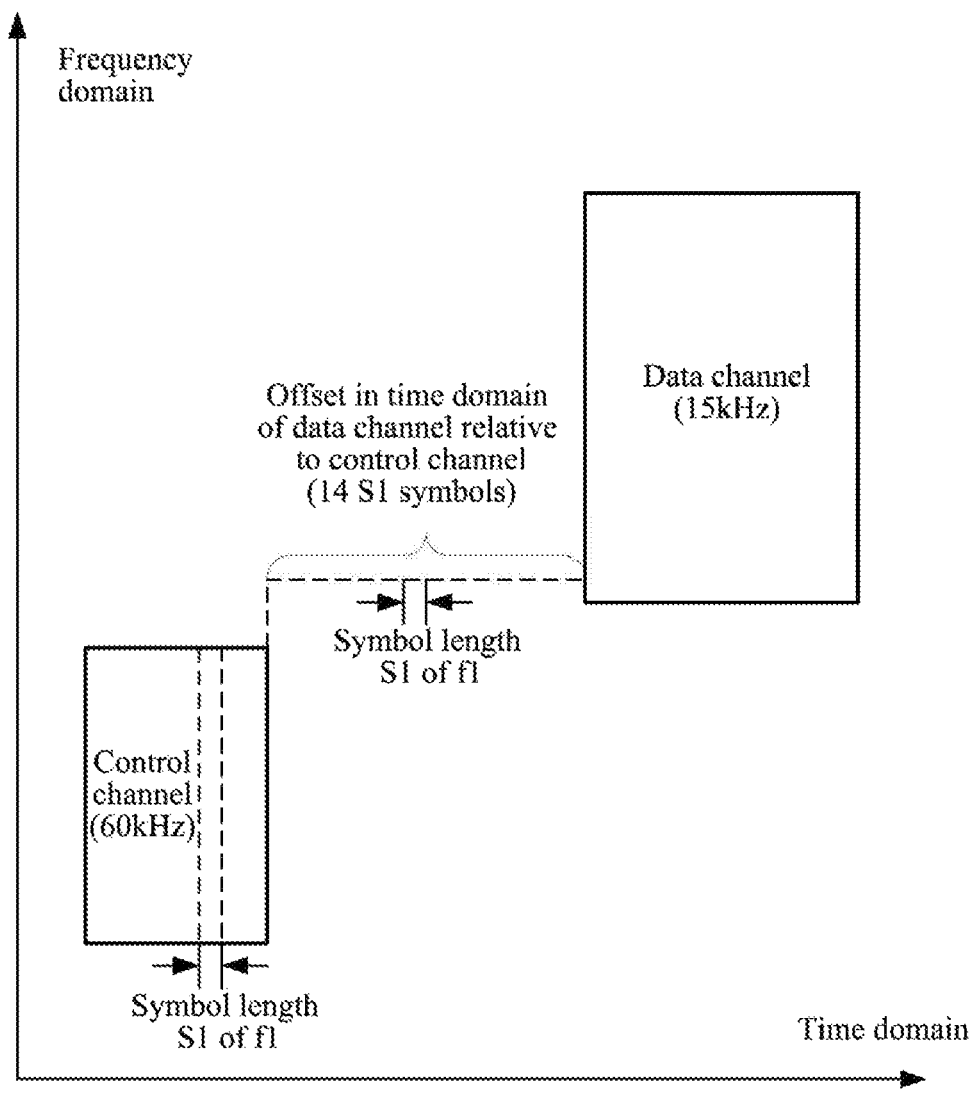
FIG. 6 is a schematic diagram of an indication of a time domain starting point of a data channel provided by implementation 3 of the present disclosure.

For example, as shown in FIG. 6, assuming f1 is 60 kHz and f2 is 15 kHz, the symbol length S2 of the data channel is 4 times the symbol length S1 of the control channel, and when indicating the time domain starting point of the data channel, the indication is made based on max(f1,f2), that is, the symbol length S1 of f1. First, the symbol of length S1 where the time domain end point of the control channel is located is determined, and then the offset of the time domain start point of the data channel relative to the symbol is indicated, for example, 17 symbols, each of which the length is S1. In this manner, the terminal does not need to know the S2 symbol where the time domain end point of the control channel is located, which further simplifies the operation complexity of the terminal and helps to realize more flexible control channel resource allocation, compared with the manners based on f2 in Implementations one and two.

Implementation Four

A symbol/slot occupied by a data channel is indicated by a bitmap based on a symbol/slot length of a subcarrier spacing adopted by the data channel. That is, the network side device indicates the symbol/slot occupied by the data channel based on a bitmap of the symbol/slot length of the subcarrier spacing adopted by the data channel. For example, assuming that the subcarrier spacing of the control channel is f1, the subcarrier spacing of the data channel is f2, the symbol length based on f2 is S2, and the slot length based on f2 is D2, then a symbol occupied by the data channel is indicated by a bitmap based on S2, and a slot occupied by the data channel is indicated by a bitmap based on D2.

Figure 7:
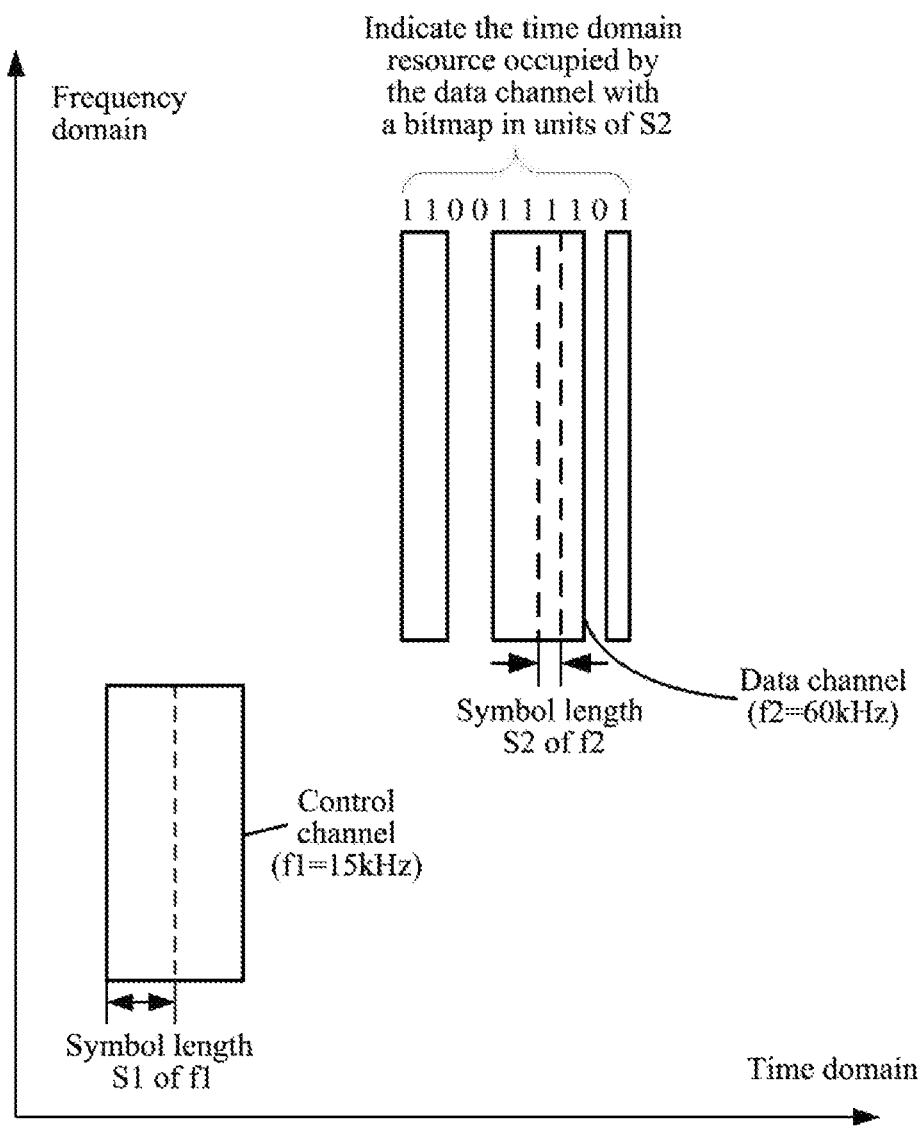
FIG. 7 is a schematic diagram of an indication of a symbol occupied by a data channel provided by implementation 4 of the present disclosure.

This method is very suitable for a situation where the data channel occupies discontinuous time domain resources. As shown in FIG. 7, one bitmap may be used to indicate the time domain resources occupied by the data channel, and each bit indicates a symbol with a length of S2. Assuming that the data channel occupies the 1st, 2nd, 5th, 6th, 7th, 8th and 10th symbols, each of which the length is S2, a bitmap 1100111101 may be used for indication. It can be seen that this manner can realize more flexible time domain resource scheduling.

It should be noted that the manners in the above implementations may be used alternatively or in combination. For example, the time domain length of the data channel in Implementation 1 may be indicated based on the subcarrier spacing adopted by the data channel, and the time domain starting point of the data channel may be indicated based on the maximum subcarrier spacing in the system.

The network side device determines and transmits the time domain resource indication information of the data channel to the terminal device according to the manner in the above implementation. Correspondingly, after receiving the time domain resource indication information, the terminal device parses the time domain resource indication information of the data channel based on the manner of indicating the time domain resource in the above implementation.

In addition, it should be noted that the method provided by the present disclosure is not limited to a 5G NR system, but is applicable to all mobile communication systems adopting multiple subcarrier spacings.

After the network side device indicates the time domain resource information of the data channel by using the above-mentioned manners, transmission and reception of the data channel may be performed on the indicated time domain resource between the network side device and the terminal device. The data channel may be an uplink data channel or a downlink data channel.

The above is a detailed description of the method provided by the present disclosure, and the following is a description of the apparatus provided by the present disclosure.

Figure 8:
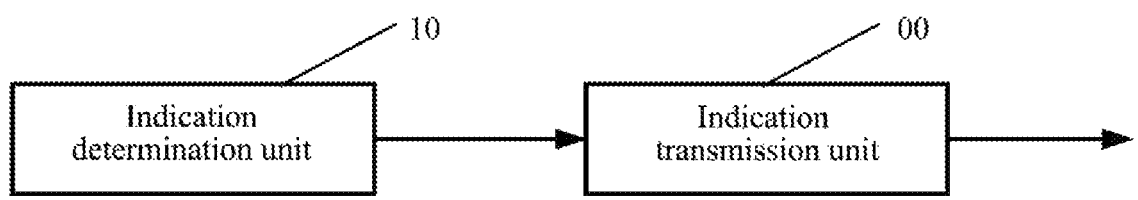
FIG. 8 is a structural diagram of an apparatus arranged in a first device provided by an implementation of the present disclosure.

FIG. 8 is a structural diagram of an apparatus provided in a first device according to an implementation of the present disclosure. As shown in FIG. 8, the apparatus may include an indication transmission unit 00 and an indication determination unit 10.

The indication determination unit 10 is responsible for, based on preset subcarrier spacing information, determining to transmit time domain resource indication information of a data channel, and providing the time domain resource indication information to the indication transmission unit 00 for transmitting.

The indication transmission unit 00 is responsible for transmitting the time domain resource indication information of the data channel to a second device based on the preset subcarrier spacing information in a mobile communication system adopting multiple subcarrier spacings.

Figure 9:
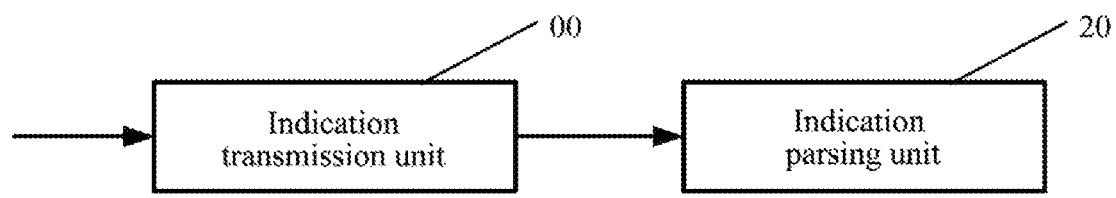
FIG. 9 is a structural diagram of an apparatus arranged in a second device provided by an implementation of the present disclosure.

FIG. 9 is a structural diagram of an apparatus provided in the second device according to an implementation of the present disclosure. As shown in FIG. 9, the apparatus may include an indication transmission unit 00 and an indication parsing unit 20.

The indication transmission unit 00 receives time domain resource indication information of the data channel transmitted by the first device based on preset subcarrier spacing information in a mobile communication system adopting multiple subcarrier spacings.

The indication parsing unit 20 is responsible for parsing the time domain resource indication information of the data channel received by the indication determination unit 00 based on the preset subcarrier spacing information to determine a time domain resource occupied by the data channel.

Similarly to the method implementation, the first device may be a network side device and the second device may be a terminal device. Or, both the first device and the second device may be terminal devices.

In an implementation of the apparatus, the indication of the time domain resource information of the data channel based on the preset subcarrier spacing information may be seen in the relevant description in the implementation of the method and will not be repeated here.

The above method and apparatus provided by the implementations of the present disclosure may be implemented in the form of one or more integrated circuits such as codec chips, or may be completed by instructing relevant hardware through a program, which may be stored in a computer readable storage medium. Each unit in the above implementation may be implemented in a form of hardware or in a form of a software functional module. The present disclosure does not limit any specific form of the combination of hardware and software.

For example, the present disclosure may be realized by a device, including: one or more processors; a memory; one or more programs, stored in the memory and executed by the one or more processors to implement the following acts: transmitting, based on preset subcarrier spacing information, time domain resource indication information of a data channel to a second device in a mobile communication system adopting multiple subcarrier spacings; or, receiving, the time domain resource indication information of the data channel transmitted by a first device based on preset subcarrier spacing information.

In addition, with the development of time and technology, the meaning of media is becoming more and more extensive, and a transmission way of a program is no longer limited to tangible media, but may also be downloaded directly from the network, etc. Any combination of one or more computer readable mediums may be adopted. The computer readable medium may be a computer readable signal medium or a computer readable storage medium. The computer readable storage medium, for example, may be, but not limited to, an electrical, magnetic, optical, electromagnetic, infrared, or semiconductor system, apparatus, or device, or any combination thereof. Specific examples of computer readable storage media (a non-exhaustive list) include electrical connections with one or more wires, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices, or any suitable combination thereof. In this document, the computer readable storage medium may be any tangible medium containing or storing a program that may be used by or in connection with an instruction execution system, apparatus, or device.

The computer readable signal medium may include a data signal propagated in baseband or as part of a carrier wave, in which computer readable program codes are carried. Such propagated data signals may take many forms, including, but not limited to, electromagnetic signals, optical signals, or any suitable combination thereof. The computer-readable signal medium may be any computer-readable medium other than a computer-readable storage medium, the computer-readable medium may send, propagate, or transport programs used by or in connection with an instruction execution system, apparatus, or device.

The above description is only for preferred implementations of the present disclosure and is not intended to limit the present disclosure. Any modification, equivalent substitution, improvement, etc. made within the spirit and principle of the present disclosure shall be included within the protection scope of the present disclosure.

What is claimed is:

1. A method for indicating time domain resource information, comprising:
   receiving, by a terminal device time domain resource indication information of a data channel conveyed by a network device based on preset subcarrier spacing information in a mobile communication system adopting a plurality of subcarrier spacings,
   wherein the preset subcarrier spacing information comprises one of the plurality of subcarrier spacings,
   wherein the time domain resource indication information of the data channel indicates a time domain starting point and a time domain length of the data channel, and
   wherein the time domain starting point of the data channel is indicated based on the subcarrier spacing adopted by the data channel.

2. The method of claim 1, wherein the time domain resource indication information of the data channel further comprises at least one of the following:
   indication information of a subcarrier spacing on which the time domain resource indication information is based;
   a value of the subcarrier spacing on which the time domain resource indication information is based;
   indication information of a rule on which the time domain resource indication information is based, wherein the rule is based on the plurality of subcarrier spacings.

3. The method of claim 1, wherein the time domain length of the data channel is indicated based on a subcarrier spacing adopted by the data channel.

4. The method of claim 3, wherein that the time domain length of the data channel is indicated based on the subcarrier spacing adopted by the data channel comprises:
   the time domain length of the data channel is indicated in units of a first symbol length or a first slot length, wherein the first symbol length is a symbol length based on the subcarrier spacing adopted by the data channel, and the first slot length is a slot length based on the subcarrier spacing adopted by the data channel.

5. The method of claim 1, wherein that the time domain starting point of the data channel is indicated based on the subcarrier spacing adopted by the data channel comprises:
   the time domain starting point of the data channel is indicated in units of at least one of a first symbol length or a first slot length, wherein the first symbol length is a symbol length based on the subcarrier spacing adopted by the data channel, and the first slot length is a slot length based on the subcarrier spacing adopted by the data channel.

6. The method of claim 5, wherein that the time domain starting point of the data channel is indicated in units of at least one of the first symbol length or the first slot length comprises:
   at least one of the time domain starting point of the data channel is indicated by a number of at least one of the first symbol lengths or the first slot lengths contained in an offset of a time domain position of the data channel relative to that of a control channel; or,
   at least one of the time domain starting point of the data channel is indicated by a number of at least one of the first symbol lengths or the first slot lengths contained in an offset of a time domain position of the data channel relative to that of a time domain region containing the control channel.

7. The method of claim 6, wherein the time domain location of the control channel comprises:
   the symbol or time slot based on the subcarrier spacing of the data channel where the time domain starting point of the control channel is located.

8. The method of claim 1, wherein a control channel and the data channel adopt different bandwidth parts in the mobile communication system.

9. A non-transitory storage medium containing computer-executable instructions for implementing operations in the method of claim 1 when executed by a computer processor.

10. An apparatus for indicating time domain resource information, arranged at a terminal side, comprising:
  one or more processors;
  a memory; and
  one or more programs stored in the memory, wherein the one or more programs, when executed by the one or more processors, implement following operations:
    receiving time domain resource indication information of a data channel conveyed by a network device based on preset subcarrier spacing information in a mobile communication system adopting a plurality of subcarrier spacings,
    wherein the preset subcarrier spacing information comprises one of the plurality of subcarrier spacings,
    wherein the time domain resource indication information of the data channel indicates a time domain starting point and a time domain length of the data channel, and
    wherein the time domain starting point of the data channel is indicated based on the subcarrier spacing adopted by the data channel.

11. The apparatus of claim 10, wherein the one or more programs, when executed by the one or more processors, further implement following operations:
  receiving the time domain resource indication information of the data channel conveyed by the network device; and
  parsing, based on the preset subcarrier spacing information, the time domain resource indication information of the data channel received, to determine a time domain resource occupied by the data channel.

12. The apparatus of claim 10, wherein the time domain resource indication information of the data channel further comprises at least one of the following:
  indication information of a subcarrier spacing on which the time domain resource indication information is based;
  a value of the subcarrier spacing on which the time domain resource indication information is based;
  indication information of a rule on which the time domain resource indication information is based, wherein the rule is based on the plurality of subcarrier spacings.

13. The apparatus of claim 10, wherein the time domain length of the data channel is indicated based on the subcarrier spacing adopted by the data channel.

14. The apparatus of claim 10, wherein a control channel and the data channel adopt different bandwidth parts in the mobile communication system.

* * * * *